F. Jones,
Horse Collar.

No. 92,534. Patented July 13, 1869.

Witnesses:
John F. Brook
Alex T. Roberts

Inventor:
F. Jones.

p. Munn & Co
Attorneys.

United States Patent Office.

F. JONES, OF BURLINGTON, IOWA.

Letters Patent No. 92,534, dated July 13, 1869.

IMPROVEMENT IN COMBINED COLLAR AND HAMES.

The Schedule referred to in these Letters Patent and making part of the same.

*To all whom it may concern:*

Be it known that I, F. JONES, of Burlington, Des Moines county, Iowa, have invented a new and useful Improvement in Combined Collar and Hames; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to simplify and cheapen the construction of harness-collars and hames, and at the same time make them more convenient and effective in use; and It consists in forming a longitudinal groove or recess on the under sides of the hames, along their inner edges, as hereinafter more fully described.

Figure 1:
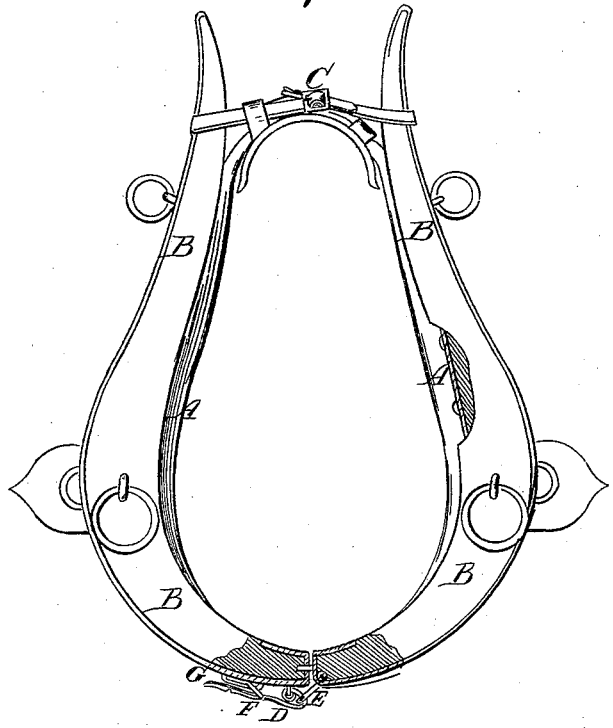
Figure 1 is a front view of my improved collar and hames, parts being broken away, to show the construction.
Figure 2:
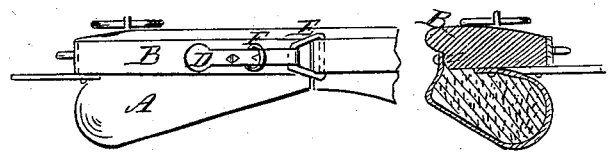
Figure 2 is a lower end view of the same, partly in section, to show the construction.

A is the collar, which is made without a hame-rims, and is securely nailed to the hames B, as shown in figs. 1 and 2, said nailing being done in a longitudinal groove or recess along the inner edges of said hames and collar, as shown in figs. 1 and 2.

The collar and hames are left open at both ends, and are connected, at their upper ends, by straps, C, in the ordinary manner.

The lower ends of the parts of the collar and hames are made square, to fit upon each other, may be faced with metal, and may be provided with a dowel-pin attached to the end of one part, and entering a hole in the other part, as shown in fig. 1.

D is a hook, or bent lever, which is pivoted to a staple, attached to one of the hames B, near its lower end.

In securing the combined collar and hames to the horse's neck, the free end of the hook-lever D is passed through a link or ring, E, pivoted to the end of the other hame, and is then turned back and passed through the ring F, sliding upon a long staple, G, attached to the same hame that the lever D is pivoted to, as shown in figs. 1 and 2.

The fastening D E F G is strong, simple, easily fastened and unfastened, and cannot become accidentally unfastened while in use.

By constructing the collar and hames permanently attached to each other in this way, no hames-rim is required to be made upon the collar, thus saving a large amount of stock and labor in their manufacture, and consequently greatly diminishing the cost of construction, while, at the same time, they are more convenient in use, being more readily placed upon and removed from the horse.

I claim as new, and desire to secure by Letters Patent—

The groove or recess *a*, formed on the under side and along the inner edges of the hames B B, one side of the collar A being secured therein, and the other attached to the flat under surface of said hames, as and for the purpose specified.

F. JONES.

Witnesses:
F. WILCOX,
P. R. GARMAN.